United States Patent
Chen et al.

(10) Patent No.: US 11,038,963 B2
(45) Date of Patent: Jun. 15, 2021

(54) SYSTEM AND METHOD FOR DATA PAYLOAD COLLECTION MONITORING AND ANALYSIS IN A TRANSACTION PROCESSING ENVIRONMENT

(71) Applicant: Oracle International Corporation, Redwood Shores, CA (US)

(72) Inventors: Hui Chen, Beijing (CN); Todd Little, Palatine, IL (US); Xiangdong Li, Beijing (CN); Jim Yongshun Jin, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/527,606

(22) Filed: Jul. 31, 2019

(65) Prior Publication Data
US 2019/0379737 A1 Dec. 12, 2019

Related U.S. Application Data

(63) Continuation of application No. 14/996,780, filed on Jan. 15, 2016, now Pat. No. 10,397,325.

(60) Provisional application No. 62/244,976, filed on Oct. 22, 2015.

(51) Int. Cl.
*H04L 29/08* (2006.01)
*H04L 12/24* (2006.01)

(52) U.S. Cl.
CPC .......... *H04L 67/1097* (2013.01); *H04L 41/20* (2013.01); *H04L 67/34* (2013.01)

(58) Field of Classification Search
CPC ...... H04L 41/20; H04L 67/34; H04L 67/1097
See application file for complete search history.

(56) References Cited

U.S. PATENT DOCUMENTS

| | | | |
|---|---|---|---|
| 6,151,602 | A | 11/2000 | Hejlsberg et al. |
| 7,480,660 | B1 | 1/2009 | Black |
| 7,483,994 | B1 | 1/2009 | Stephens et al. |

(Continued)

FOREIGN PATENT DOCUMENTS

| | | |
|---|---|---|
| CN | 1674578 | 9/2005 |
| CN | 104333485 | 2/2015 |

(Continued)

OTHER PUBLICATIONS

"Oracle Tuxedo System and Applications Monitor Plus: Product Overview", 12c Release 2 (12.1.3), Jun. 2015, 28 pages.

(Continued)

*Primary Examiner* — Azizul Choudhury
(74) *Attorney, Agent, or Firm* — Tucker Ellis LLP

(57) ABSTRACT

A self-describing data format capable of carrying payload information, such as Tuxedo payload information, as well as filter information. The data format can allow for expression of some or all of Tuxedo Typed Buffers, including STRING, CARRAY, MBSTRING, VIEW, VIEW32, FML, and FML32. The data format is also capable of supporting nesting and error-checking. The proposal of user payload collection can allow customers to siphon off user/payload data to be used in applications, such as Business Intelligence applications, without the need for additional information to be passed with the payload data.

14 Claims, 5 Drawing Sheets

(56) References Cited

U.S. PATENT DOCUMENTS

| | | | |
|---|---|---|---|
| 8,504,681 B1* | 8/2013 | Cooper | H04L 51/32 709/224 |
| 2003/0023715 A1 | 1/2003 | Reiner et al. | |
| 2005/0055399 A1 | 3/2005 | Savchuk | |
| 2005/0049924 A1 | 5/2005 | DeBettencourt et al. | |
| 2006/0200444 A1* | 9/2006 | Bracho | H04L 63/105 |
| 2007/0016573 A1* | 1/2007 | Nanavati | H04L 67/16 |
| 2008/0177879 A1* | 7/2008 | Krishnan | H04L 41/0896 709/226 |
| 2008/0288212 A1 | 11/2008 | Greifeneder | |
| 2008/0306712 A1* | 12/2008 | Chen | G06F 11/3495 702/186 |
| 2013/0198245 A1 | 8/2013 | Kagan et al. | |
| 2013/0311553 A1 | 11/2013 | Lu et al. | |
| 2014/0201418 A1* | 7/2014 | Turner | H04L 67/02 710/313 |
| 2015/0067146 A1 | 3/2015 | Raker et al. | |
| 2017/0118184 A1* | 4/2017 | Mantzke | H04L 9/0869 |
| 2018/0337840 A1* | 11/2018 | Goyal | H04L 43/50 |

FOREIGN PATENT DOCUMENTS

| | | |
|---|---|---|
| EP | 2869625 | 5/2015 |
| GB | 2306863 | 5/1997 |

OTHER PUBLICATIONS

"Oracle Tuxedo System and Applciations Monitor Plus: Release Notes", 12c Release 2 (12.1.3), Jun. 1, 2015, retrieved from the Internet: https://docs.oracle.com/cd/E53645_01/tsam/docs12cr2/pdf/relnotes/pdf, 16 pages.

International Search Report and the Written Opinion of the International Searching Authority dated Jan. 16, 2017 for PCT Application No. PCT/US2016/055968, 11 pages.

Extended European Search Report for European Patent Application No. 16857994.4, dated Apr. 23, 2019, 21 pages.

Indian Patent Office, First Examination Report dated Jul. 27, 2020 for Indian Patent Application No. 201747032100, 7 pages.

European Patent Office, Communication pursuant to Article 94(3) EPC dated Oct. 29, 2020 for EP Application No. 16857994.4, 8 pages.

Chinese Patent Office, Office Action dated Nov. 11, 2020 for Chinese Patent Application No. 201680022893.7, 3 pages.

European Patent Office, Communication pursuant to Article 94(3) EPC dated Mar. 10, 2020 for EP Application No. 16857994.4, 9 pages.

Chinese Patent Office, Office Action dated Apr. 15, 2020 for Chinese Patent Application No. 201680022893.7, 12 pages.

European Patent Office, Summons to attend oral proceedings pursuant to Rule 115(1) EPC dated Mar. 11, 2021 for EP Application No. 16857994.4, 11 pages.

* cited by examiner

SYSTEM AND METHOD FOR DATA PAYLOAD COLLECTION MONITORING AND ANALYSIS IN A TRANSACTION PROCESSING ENVIRONMENT

CLAIM OF PRIORITY

This application is a continuation of, and claims the benefit of priority to, U.S. Patent Application entitled "SYSTEM AND METHOD FOR DATA PAYLOAD COLLECTION MONITORING AND ANALYSIS IN A TRANSACTION PROCESSING ENVIRONMENT", application Ser. No. 14/996,780, filed on Jan. 15, 2016, which application claims priority to U.S. Provisional Application titled "SYSTEM AND METHOD FOR DATA PAYLOAD COLLECTION MONITORING AND ANALYSIS IN A TRANSACTION PROCESSING ENVIRONMENT", Application No. 62/244,976, filed Oct. 22, 2015, which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to a transaction processing environment.

BACKGROUND

Traditional mechanisms working with Tuxedo applications can capture application information including service data and call-path data. What is desired, however, is a mechanism to capture user payload data as well as a self-describing data format capable of carrying the desired user payload data.

SUMMARY

A self-describing data format capable of carrying payload information, such as Tuxedo payload information, as well as filter information. The data format can allow for expression of some or all of Tuxedo Typed Buffers, including STRING, CARRAY, MBSTRING, VIEW, VIEW32, FML, and FML32. The data format is also capable of supporting nesting and error-checking. User payload collection can allow clients to siphon off user data to be used in applications, such as Business Intelligence (BI) applications, without the need for additional information to be passed with the payload data.

DETAILED DESCRIPTION

Figure 1:
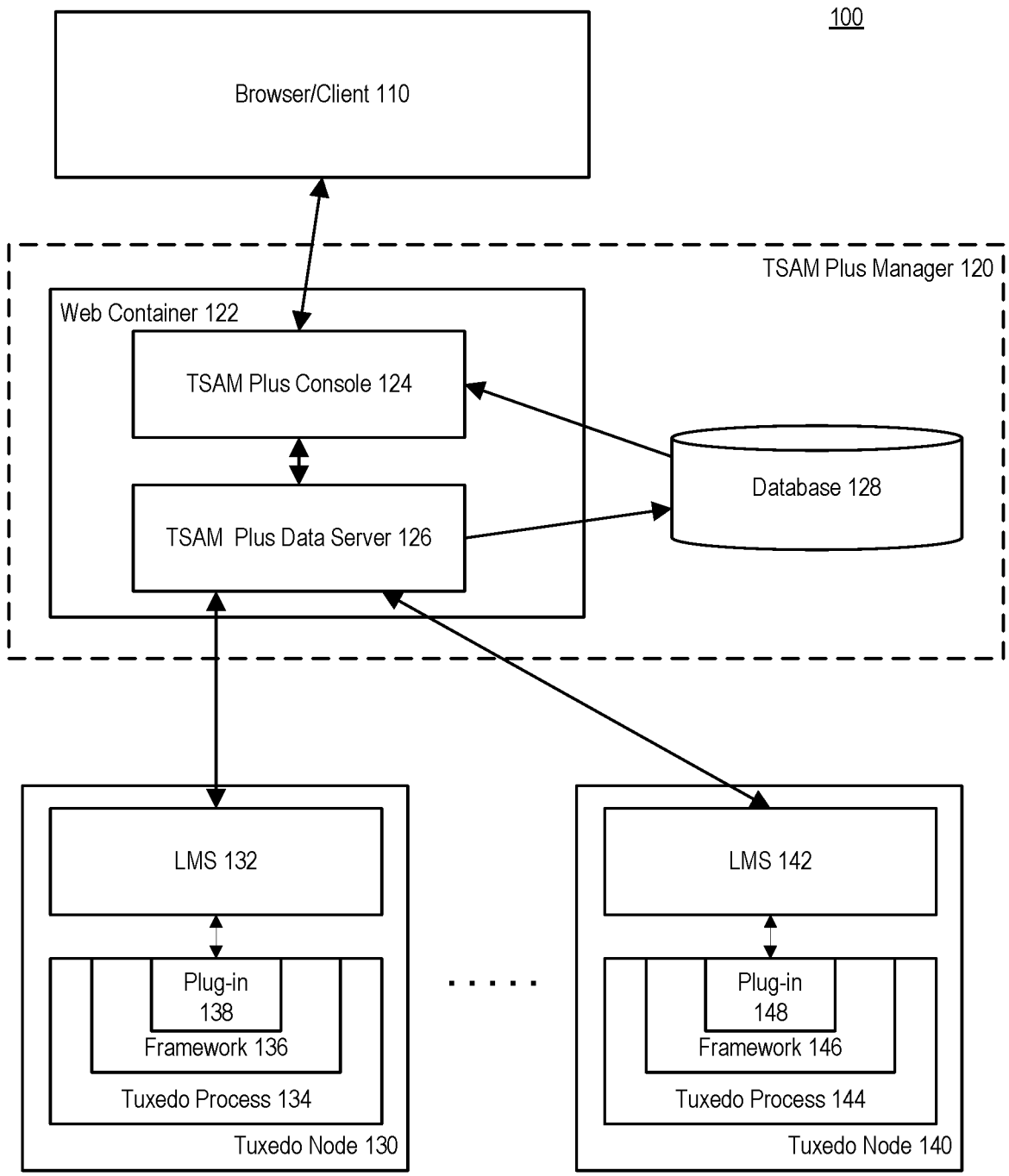
FIG. 1 shows an illustration of TSAM Plus within a transactional middleware environment.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one. While specific implementations are discussed, it is understood that the specific implementations are provided for illustrative purposes only. A person skilled in the relevant art will recognize that other components and configurations may be used without departing from the scope and spirit of the invention.

The description of the invention as following uses the Tuxedo environment as an example for a transactional middleware machine environment. It will be apparent to those skilled in the art that other types of transactional middleware machine environments can be used without limitation.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention. For example, the detailed description uses an XA distributed transaction environment as an example. It will be apparent to those skilled in the art that the present invention has application to other types of distributed transaction environments without limitation.

Common reference numerals are used to indicate like elements throughout the drawings and detailed description; therefore, reference numerals used in a figure may or may not be referenced in the detailed description specific to such figure if the element is described elsewhere.

Described herein are systems and methods for data payload collection monitoring and analysis in a transaction processing environment.

Transactional Middleware Environment

A transactional middleware system can comprise a combination of high performance hardware, e.g. 64-bit processor technology, high performance large memory, and redundant InfiniBand™ and Ethernet networking, together with an application server or middleware environment, such as WebLogic™ Suite, to provide a complete Java™ EE application server complex which includes a massively parallel in-memory grid, that can be provisioned quickly, and can scale on demand. The system can be deployed as a full, half, or quarter rack, or other configuration, that provides an application server grid, storage area network, and InfiniBand™ (IB) network. The middleware machine software can provide application server, middleware and other functionality such as, for example, WebLogic™ Server, JRockit™ or Hotspot JVM, Oracle™ Linux or Solaris, and Oracle™ VM. The system can include a plurality of compute nodes, IB switch gateway, and storage nodes or units, communicating with one another via an IB network. When implemented as a rack configuration, unused portions of the rack can be left empty or occupied by fillers.

For example, in systems such as "Sun Oracle Exalogic" or "Exalogic", the system is an easy-to-deploy solution for hosting middleware or application server software, such as the Oracle™ Middleware SW suite, or Weblogic. As described herein the transactional middleware system can be a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Oracle™ Real Application Clusters (RAC) Enterprise database, which is a clustered database with shared cache architecture and can be a component of a cloud architecture, and Exalogic Open storage. The system delivers improved performance with linear I/O scalability, is simple to use and manage, and delivers mission-critical availability and reliability.

In accordance with an embodiment of the invention, a transactional middleware system, such as a Tuxedo system, can take advantage of fast machines with multiple processors, such as an Exalogic middleware machine, and a high performance network connection, such as an Infiniband™ (IB) network.

An Oracle™ Tuxedo system provides a set of software modules that enables the construction, execution, and administration of high performance, distributed business applications and has been used as transactional middleware by a number of multi-tier application development tools. Tuxedo is a middleware platform that can be used to manage distributed transaction processing in distributed computing environments. It is a proven platform for unlocking enterprise legacy applications and extending them to a services oriented architecture, while delivering unlimited scalability and standards-based interoperability.

Furthermore, Tuxedo provides a service-oriented infrastructure for efficiently routing, dispatching, and managing requests, events, and application queues across system processes and application services. With virtually limitless scalability, it manages peak transaction volumes efficiently, improving business agility and letting IT organizations quickly react to changes in business demands and throughput. Oracle™ Tuxedo optimizes transactions across multiple databases an0d ensures data integrity across all participating resources, regardless of access protocol. The system tracks transaction participants and supervises an extended commit protocol, ensuring that all transaction commits and rollbacks are properly handled.

Additionally, the Oracle™ Tuxedo system can comply with the Open Group's X/Open™ standards, including the support of the XA standard for two-phase commit (2PC) processing, the X/Open™ ATMI API, the X/Open™ "Distributed Transaction Processing: The TX (Transaction Demarcation) Specification", and the X/Open™ Portability Guide (XPG) standards for language internationalization. The transactional application server can be referred to as an XA server, when it uses the XA standard. For example, each Tuxedo application server that belongs to a Tuxedo group can be configured using an OPENINFO property. All XA servers in a Tuxedo group can use the OPENINFO property to establish the connection to a resource manager (RM).

TSAM Plus

Oracle Tuxedo is widely used by enterprises that develop and use mission-critical applications. Tuxedo can act as the infrastructure layer in distributed computing environments. The complexity of Oracle Tuxedo and the applications running on top of it makes performance measurement extremely complex.

Oracle Tuxedo System and Applications Monitor Plus (TSAM Plus) can provide comprehensive monitoring and reporting for Oracle Tuxedo system and applications. It includes three components: Oracle TSAM Plus Agent, Oracle TSAM Plus Manager, and Enterprise Manager for Oracle Tuxedo.

The Oracle TSAM Plus agent enables collection of various applications performance metrics (including call path, transactions, services, system servers). The Oracle TSAM Plus Manager can also provide graphical user interface that correlates and aggregates performance metrics collected from one or more Tuxedo domains. TSAM Plus can display this information in interactive real time. The Enterprise Manager for Oracle Tuxedo integrates Tuxedo management and monitoring with Oracle Enterprise Manager, allowing Tuxedo infrastructure and applications to be monitored and managed from the same console as other Oracle products.

For example, TSAM Plus can provide various information about widely deployed Tuxedo frameworks. This information can include, but is not limited to, end-to-end execution time of an ATMI (Application-to-Transaction Monitor Interface) request, hung calls, a number of to a service that failed during a certain time period, a number of requests that went through a domain gateway during a certain time period, and the current status of all participants in an XA transaction.

By providing this information, TSAM plus can allow users to easily identify bottlenecks and expedite problem resolution. Oracle TSAM Plus can also help with performance tuning and capacity planning.

FIG. 1 shows an illustration of TSAM Plus within a transactional middleware environment 100.

Within the transactional middleware environment 100, a TSAM Plus manager 120 can include a web container 122, which can include a TSAM Plus console 124 and a TSAM Plus data server 126. A database 128 can also be included in the TSAM Plus manager. The TSAM Plus console can interact with a browser/client 110.

One or more tuxedo nodes, 130 and 140, can be provided within the transactional middleware environment as well. Each of the Tuxedo nodes can include a local monitor service (LMS) 132, 142, and a Tuxedo process 134, 144. Each of the Tuxedo processes in turn can include a framework 136, 146, (e.g., a TSAM Plus Framework), which can in turn include a plug-in 138, 148, respectively.

In accordance with an embodiment, the framework 136, 146, comprise a data collection engine. The framework can be an independent layer working between Tuxedo infrastructure and other TSAM Plus components. The framework module can be responsible for run time metrics collection, alert evaluation and monitoring policy enforcement.

In accordance with an embodiment, the plug-in 138, 148, can comprise a TSAM Plus plug-in, which can be an extensible mechanism invoked by the Oracle TSAM Plus Framework. The Oracle TSAM Plus Agent can provide a default plug-in to send data to the LMS (Local Monitor Server), and then to the Oracle TSAM Plus Manager. The plug-in allows custom plug-in to be hooked to intercept the metrics. The default plug-in communicates with LMS with shared memory. Application will not be blocked at metrics collection point. Users/clients can develop custom plug-ins for additional data processing. A customized plug-in can be linked to an existing plug-in chain, or it can replace the default plug-in.

In accordance with an embodiment, the local monitor service 132, 142, can comprise an Oracle Tuxedo system server. The Oracle TSAM Plus default plug-in sends data to the LMS. The LMS can then pass the data to the Oracle TSAM Plus Manager in HTTP protocol. LMS can be present on each Tuxedo machine if the node need to be monitored.

As mentioned above, Oracle TSAM Plus comprises three components: a TSAM Plus Agent, which can perform Tuxedo-side data collection, a TSAM Plus Manager, which can perform data storage, aggregation, computing and representation, and an enterprise manager for Tuxedo, which can be a plug-in that performs monitoring and management for Tuxedo.

In accordance with an embodiment, TSAM Plus Agent handles Tuxedo-side back-end logic. The TSAM Plus Agent can work in conjunction with the Oracle TSAM Plus Manager, and can include the TSAM Plus Framework, the TSAM Plus Plug-In, a LMS, and a JMX Agent.

In accordance with an embodiment, a TSAM Plus Framework can be an Oracle Tuxedo-side facility that defines and controls performance metrics collection behavior. It can use the Tuxedo traditional interface and can be easily integrated into an existing Tuxedo management suite.

In accordance with an embodiment, a TSAM Plus Plug-In can be an extensible mechanism invoked by the TSAM Plus Framework. The Oracle TSAM Plus Agent can provide default plug-ins to send data to the Local Monitor Server (LMS), and then to the Oracle TSAM Plus Manager. The default plug-in can additionally check event triggers, and generate events when called to do so.

For example, users can develop/customize plug-ins for additional data processing. A customized plug-in can be linked to an existing plug-in chain, or replace the default plug-in.

In accordance with an embodiment, a Local Monitor Server (LMS) can be an Oracle Tuxedo system server. The Oracle TSAM Plus default plug-in can send data to the LMS. The LMS can then pass the data to the Oracle TSAM Plus Manager in a message format.

In accordance with an embodiment, a JMX Agent can work in conjunction with Enterprise Manager for Oracle Tuxedo, which enables monitoring and management of Oracle Tuxedo applications through the JMX interface and furthermore, through the Oracle Enterprise Manger cloud control 12c.

In accordance with an embodiment, the TSAM Plus Manager can be the data manipulation and representation component of Oracle TSAM Plus. It can be a J2EE application. The TSAM Plus Manager can communicate with the Oracle TSAM Plus Agent for performance metrics, configuration information and other utility messages. The TSAM Plus Manager can additionally provide a web console for Oracle TSAM Plus administration, monitored data presentation and alerts management.

TSAM Plus Standalone User Payload Collection

TSAM Plus, as described above, already has most of the infrastructure necessary to capture transactional (service) data within a domain as part of service monitoring and call path monitoring. However, the addition of user payload collection can allow customers to siphon off user/payload data to be used in, for example, Business Intelligence applications, ideally with no application changes required. Some of the types of analysis performed as part of BI include: Enterprise Performance Management (EPM)—monitoring/analyzing the performance of an enterprise against its business goals such as new customer acquisition, days outstanding for receivables perhaps by demographics, customer support hold times, etc.; Online Analytical Processing (OLAP)—multi-dimensional analytic queries, consolidation, drill-down, and slicing and dicing information in more than one dimension; and Data Mining—looking for patterns often in large data sources.

In Tuxedo applications, the format of user data is called Tuxedo Typed Buffer. There are several kinds, including STRING, CARRAY, MBSTRING, VIEW, VIEW32, FML, and FML32. In situations where no data conversion is performed (i.e., the original format of the data is stored instead), then there are a number of limitations. One way to avoid limitations is to utilize a data format, such as FAST-DATA. FAST-DATA can carry both Tuxedo payload information and filter information. FAST-DATA can express all simple or complex Tuxedo Typed Buffer (STRING, CARRAY, MBSTRING, VIEW, VIEW32, FML, and FML32). FAST-DATA supports nesting and error-checking, and can avoid many limitations.

FAST-DATA can carry not only Tuxedo payload information, but also filter information. It is very powerful, and can express all simple or complex Tuxedo Typed Buffer, and supports nesting and error-checking.

With this data format, it is not necessary for a customer to create or maintain any describing files. The procedure to extract user data becomes very simple.

Figure 2:
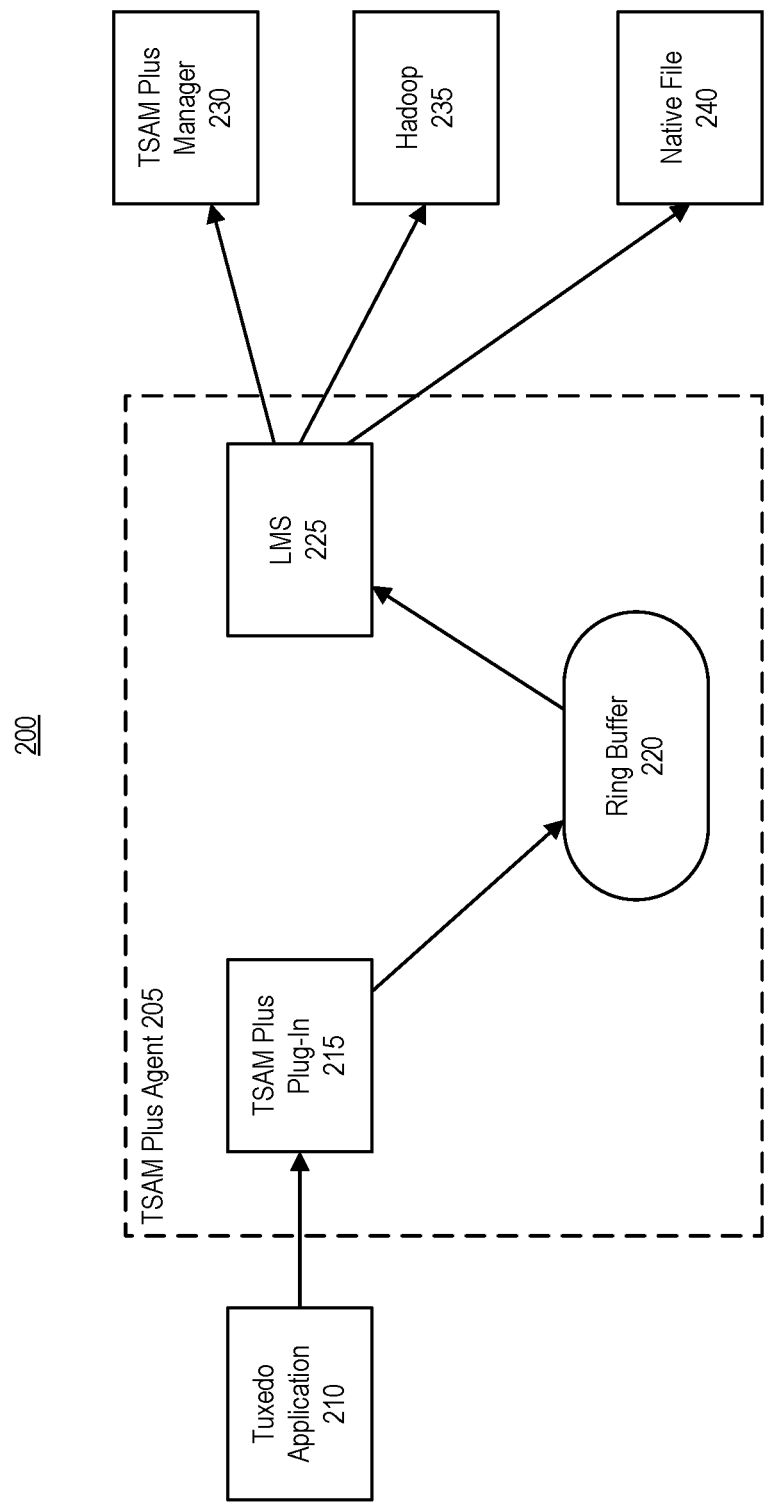
FIG. 2 shows an illustration of data payload collection, in accordance with an embodiment.

Referring now to FIG. 2, which shows an illustration of data payload collection, in accordance with an embodiment.

As shown in FIG. 2, an exemplary embodiment can include a Tuxedo application 210 communicating, with a transaction processing environment 200, with a TSAM Plus Plug-in 215, which can be contained within a TSAM Plus Agent 205. The TSAM Plus Agent 205 can additionally include a ring buffer 220 and a local monitor service (LMS) 225. The transaction processing environment 200 can additionally include a TSAM Plus manager 230, an application, such as Hadoop 235, and native files 240.

In accordance with an embodiment, when an application is running, the TSAM Plus Plug-In 215 can capture data associated with the application, such as the Tuxedo application 210. Then, the TSAM Plus Plug-in 215 can write the data to a buffer, such as ring buffer 220. The ring buffer 220 can be a shared memory. The ring buffer 220 can record data captured from the Tuxedo application 210, including service data, call-path data, as well as payload/user data.

In accordance with an embodiment, the LMS 225 can read the data from the ring buffer, including service data, call-path data, as well as payload/user data. Then, the LMS can forward the data to one or a variety of end locations, including the TSAM Plus manager 230, an application, such as Hadoop 235, or the LMS can store the data as a native file 240.

In accordance with an embodiment, all data captured from the Tuxedo application can be stored in a uniform format which is not dependent upon the type of Tuxedo data format. Without a uniform data format, customers, such as those customers receiving the user/payload data, will be required to store additional information, such as libraries or extended fields, in order to read the user/payload data to be used in applications, such as Business Intelligence (BI) applications.

TSAM Plus Standalone User Payload Filtering and Collection

Figure 3:
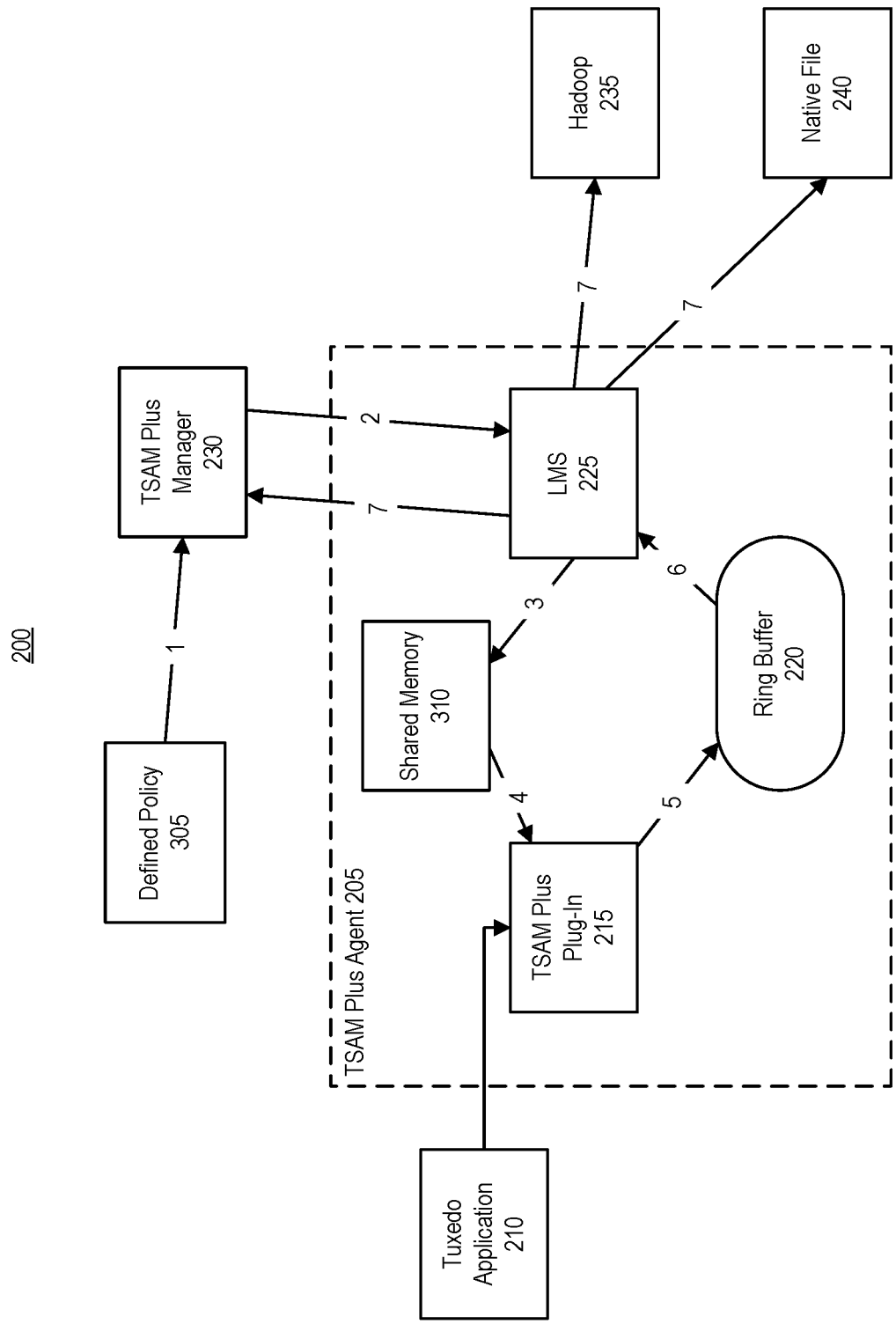
FIG. 3 shows an illustration of data payload collection, in accordance with an embodiment.

Referring now to FIG. 3 which shows an illustration of data payload collection, in accordance with an embodiment. More specifically, FIG. 3 shows a flow chart of an exemplary embodiment of the present disclosure that can filter and capture payload/user data.

In accordance with an embodiment, as shown in FIG. 3, an exemplary embodiment can include a Tuxedo application 210 communicating, with a transaction processing environment 200, with a TSAM Plus Plug-in 215, which can be contained within a TSAM Plus Agent 205. The TSAM Plus Agent can additionally include a ring buffer 220, a local monitor service (LMS) 225, and a shared memory 310. The transaction processing environment 200 can additionally include a TSAM Plus manager 230, an application, such as Hadoop 235, and native files 240. Additionally, the TSAM Plus manager 230 can receive a defined policy 305, such as a defined filtering policy, as defined, for example, by a user or a program.

In accordance with an embodiment, additionally, the embodiment depicted in FIG. 3 can utilize a defined filter policy 305 to filter data before the data is passed by the LMS. In step 1, a defined (for example, by a client/customer) policy (that can include, for example, user payload result filter) is passed in the console GUI of TSAM Plus Manager 230. At step 2, the TSAM Plus Manager can send the policy (including User payload result filter) to LMS server. The policy can be in an XML format. At step 3, the LMS server can parse the policy (including User payload result filter), and writing it into shared memory 310. At step 4, Tuxedo server or client will read the policy (including User payload result filter) from shared memory, and store them in local memory. At step 5, when a user data is arriving, Tuxedo server or client can capture the user data by TSAM Plus Plug-in, and filter it by using the definition of User payload result filter. The payload/user data, which has already passed the filter, can be stored into Ring Buffer. Then, at step 6, the LMS can fetch the filtered payload/user data from the Ring Buffer. At step 7, the LMS can forward the filtered payload/user data to database of TSAM Plus Manger, Hadoop, or Native File.

In accordance with an embodiment, a payload result filter can be specified in the payload policy to reduce the payload size or trim security-sensitive parts before logging. Here are some examples of user payload result filters:

| type name | comment | result filter |
|---|---|---|
| CARRAY | Character array (possibly containing NULL characters) that is neither encoded nor decoded during transmission | {[index1, index2]aliasName}+ |
| X_OCTET | Equivalent to CARRAY; provided for XATMI compatibility | {[index1, index2]aliasName}+ |
| STRING | NULL-terminated character array | {[index1, index2]aliasName}+ |
| FML | FML fielded buffer | {fieldName,}+ |
| VIEW | C structure or FML view | {viewName{viewFieldName,}+}+ |
| X_C_TYPE | Equivalent to VIEW; provided for XATMI compatibility | {viewName{viewFieldName,}+}+ |
| X_COMMON | Equivalent to VIEW; provided for XATMI compatibility | {viewName{viewFieldName,}+}+ |
| FML32 | FML32 fielded buffer, using 32-bit identifiers and offsets | {fieldName,}+ |
| VIEW32 | C structure or FML32 view, using 32-bit identifiers, counter variables, and size variables | {view32Name{view32FieldName,}+,}+ |
| XML | Buffer for XML documents | {elementTag,}+ |
| MBSTRING | Character array for multibyte characters | {[index1, index2]aliasName}+ |

In accordance with an embodiment, a filtering policy can be defined by customers on TSAM Manager GUI Console. After that, TSAM Manager can send the policy to TSAM agent. In the other words, LMS process will receive the policy in xml format. Here is an example of a defined filtering policy:

```
<ResultFilter>
    <CARRAY>[1,2]aliasName1,[7,8]aliasName2</CARRAY>
    <STRING>[1,2]aliasName1, [7,8]aliasName2</STRING>
    <MBSTRING>[1,2]aliasName1, [7,8]aliasName2</MBSTRING>
    <FML>
        <name>FIELD2,FIELD3</name>
        <ID>24681,24682</ID>
    </FML>
    <FML32>
        <name>FLD2,FLD3</name>
        <ID>100663406,100663407</ID>
    </FML32>
    <XML>xmlNode1,xmlNode2</XML>
    <VIEW32>
        <myView3 filterviewname="myview3">bool1,short_max,unsignedint_max</myView3>
        <myView4 filterviewname="myview4">int_inner1</myView4>
    </VIEW32>
    <VIEW>
        <myView filterviewname="myview3">field1,field2,field3</myView>
    </VIEW>
</ResultFilter>
<CARRAY>[1,2]aliasName1,[7,8]aliasName2</CARRAY>
```

This is CARRAY filter definition. aliasName1 is alias name for [1, 2], aliasName2 is alias name for [7,8]. AliasName1 and aliasName2 will be record in NAMEPOOL of FAST DATA. Actually, [1, 2], [7.8] is filter,
For example, if the payload is 012345678, it will get 12 and 78 after filtering. Plus, FAST DATA ID for this type is FLD_CARRAY<13|index, index is begin from 0, it is 0, 1, 2, 3, 4 . . . . This is an example for FAST DATA which is converted by CARRAY, and filter by this policy:
magic(0x2BEA)+type("CARRAY")+subtype('\0')+datasize(12)+ID(FLD_CARRAY<13|0)+itemsize(2)+item_value("12")+ID(FLD_CARRAY<13|1)+itemsize(2)+item_value("78")++namelen(12)+name("aliasName1")+'\a'+name("aliasName2")
<STRING>[1,2]aliasName1,[7,8]aliasName2</STRING>
This is STRING filter definition. aliasName1 is alias name for [1, 2], aliasName2 is alias name for [7,8]. Alias- Name1 and aliasName2 will be record in NAMEPOOL of FAST DATA. Actually, [1, 2], [7.8] is filter, For example, if the payload is 012345678, it will get 12 and 78 after filtering. Plus, FAST DATA ID for this type is FLD_STRING<13|index, index is begin from 0, it is 0, 1, 2, 3, 4 . . . . This is an example for FAST DATA which is converted by STRING, and filter by this policy:
magic(0x2BEA)+type("STRING")+subtype("\0")+datasize(12)+ID(FLD_STRING<13|0)+itemsize(2)+item_value("12")+ID(FLD_STRING<13|1)+itemsize(2)+item_value("78")++namelen(12)+name("aliasName1")+'\a'+name("aliasName2")

<MBSTRING>[1,2]aliasName1,[7,8]aliasName2</MBSTRING>

This is MBSTRING filter definition. aliasName1 is alias name for [1, 2], aliasName2 is alias name for [7,8]. AliasName1 and aliasName2 will be record in NAMEPOOL of FAST DATA. Actually, [1, 2], [7.8] is filter.

For example, if the payload is 012345678, it will get 12 and 78 after filtering. Plus, FAST DATA ID for this type is FLD_MBSTRING<13|index, index is begin from 0, it is 0, 1, 2, 3, 4 . . . . It will convert to FAST DATA as followed:

```
magic(0x2BEA) + type("STRING") + subtype('\0') + datasize(12) + ID(FLD_MBSTRING <13 | 0) +
itemsize(2) + item_value("12") + ID(FLD_MBSTRING <13 | 1) + itemsize(2) + item_value("78") +
+namelen(12)+name("aliasName1")+'\a'+ name("aliasName2")
<FML>
<name>FIELD2,FIELD3</name>
<ID>24681,24682</ID>
</FML>
```

This is FML filter definition. FIELD2,FIELD3 are FML field name, it will be record in NAMEPOOL of FAST DATA. 24681,24682 are FML field ID, it will be convert to ID and record in DATAPOOL of FAST DATA.

For example, if the payload is as followed:

| | |
|---|---|
| 24681 | hello |
| 24682 | world |
| 24683 | how |
| 24684 | are |

It will the following value after filtering.

| | |
|---|---|
| 24681 | hello |
| 24682 | world |

24681 and 24682 are FML field ID, from this id, we can know its type and index by our internal function. For example, if the type is FLD_STRING, and the index is 38 and 39. Then we convert it to our ID of FAST DATA, it is FLD_STRING<13|38, and FLD_STRING<13|39. It will convert to FAST DATA as followed:

```
magic(0x2BEA) +type("FML") + subtype('\0') + datasize(43) + ID(FLD_STRING<13| 38) +
itemsize(5) + item_value("hello") + ID(FLD_STRING<13| 39) + itemsize(5) + item_value("world") +
+namelen(13)+name("FIELD2")+'\a'+name("FIELD3")
<FML32>
    <name>FLD2,FLD3</name>
    <ID>100663406,100663407</ID>
</FML32>
```

This is FML32 filter definition. FLD2,FLD3 are FML32 field name, it will be record in NAMEPOOL of FAST DATA. 100663406, 100663407 are FML32 field ID, it can directly used as FAST DATA ID and record in DATAPOOL of FAST DATA.

For example, if the payload is as followed:

| | |
|---|---|
| 100663406 | hello |
| 100663407 | world |
| 100663408 | how |
| 100663409 | are |

It will the following value after filtering.

| | |
|---|---|
| 100663406 | hello |
| 100663407 | world |

It will convert to FAST DATA as followed:

```
magic(0x2BEA) +type("FML") + subtype('\0') + datasize(43) + ID(100663406) + itemsize(5) +
item_value("hello") + ID(100663407) + itemsize(5) + item_value("world") +
+namelen(9)+name("FLD2")+'\a'+name("FLD3")
<VIEW>
    <myView filterviewname="myview3">field1,field2 </myView>
</VIEW>
```

This is VIEW filter definition. From this policy definition, we can know that it only recording one VIEW type. myview3 is struct name, it will recorded as subtype of Header in FAST DATA. And field1,field2 are field name of VIEW, it will record in NAMEPOOL of FAST DATA.
For example, there is only need one view mapping file, and the content is as followed:

```
VIEW myView3
$ /* View structure for sanity test */
#type    cname    fbname count flag size null
float    field1          -   1  -  -  -0.0
float    field2          -   1  -  -  -0.0
float    field3          -   1  -  -  -0.0
END
```

The value of this VIEW data is as followed:
10.1
10.2
10.3
It will the following value after filtering.
10.1
10.2

```
<VIEW32>
    <myView3 filterviewname="myview3">bool1,short1 </myView3>
    <myView4 filterviewname="myview4">int_inner1 </myView4>
</VIEW32>
```

This is VIEW32 filter definition. From this policy definition, we can know that it only recording two VIEW32 type. One is myview3, the other is myview4. myview3 and myview4 are struct name, they will recorded as subtype of Header in FAST DATA. And bool1short1, int_inner1 are field name of VIEW, it will record in NAMEPOOL of FAST DATA.
For example, there is two view mapping files, and the content is as followed:

```
VIEW32 myview3
$ /* View structure for sanity test */
#type    cname    fbname count flag size null
bool    bool1          -   1  -  -  -0.0
short   short1         -   1  -  -  -0.0
int     int1         -  1  -  -  -0.0
END
VIEW32 myview4
$ /* View structure for sanity test */
#type    cname         fbname        count flag size null
int     int_inner1        -   1  -  -  0
END
```

The value of this VIEW32 data for myview3 is as followed:
0
10
10
It will the following value after filtering.
0
10

The value of this VIEW32 data for myview4 is as followed:
10
It will the following value after filtering.
10
FAST DATA ID for this type is FLD_***<13|index, index is begin from 0, it is 0, 1, 2, 3, 4 . . . . For example, if payload is myView3, It will convert to FAST DATA as followed:
magic(0x2BEA)+type("VIEW\a")+subtype('myView3\0')+datasize(29)+ID(FLD_BOOL<13|0)+item_value("0")+ID(FLD_SHORT<13|1)+item_value(10)+namelen(12)+name("bool1")+'\a'+name("short1")
Fast Data In the Tuxedo application, the format of user data is called Tuxedo Typed Buffer. There are several kinds, STRING, CARRAY, MBSTRING, VIEW, VIEW32, FML, and FML32. If there is data conversion and the original format of user data is stored, then there may be limitations. Such limitations can include that all Tuxedo Typed Buffer may need to clarify its type. In the other words, it can store the type name to identity every user data. As well, because some Tuxedo Typed Buffer, for example, VIEW and VIEW32, are not self-described, the buffer may need additional view description files, which can be called viewfiles, to describe a view mapping.

In some situations, technically, it may not be enough to have viewfiles only. Views utility (viewc/viewc32 command) may be needed to convert to certain file types, such as, for example, *.h and *.V files.

In accordance with an embodiment, a *.V file is a binary file, and the value of all VIEW/VIEW32 fields are stored in this file. If user data is stored with VIEW/VIEW32 format, the limitation expands in that the user also needs to carry viewfiles, or the corresponding *.h and *.V file. Customers can define different VIEW/VIEW32 data format, and it needs different viewfiles, or *.h and *.V file. The file is all outside the data, and the number of the files could be very large. Customers need to maintain the files manually, so it is not convenient when they extract the data.

In accordance with an embodiment, in situations where the amount of data is very large when generated by capturing payloads, users can filter or reduce the payload before logging. For example, in a STRING data "Hello world", a selective filter could be [0,4] with alias name "string Filter", and the data becomes "Hello" (the "H" being at index 0, the "o" being at index 4) after filtering. If the original format of user data is stored, the filter information can be lost.

In accordance with an embodiment, a data format is presented, which can be referred to as Fast Data. Fast Data presents a unified format that is self-describing and can express all Tuxedo Typed Buffers. Filter information can be carried in this unified format to track the source of the data.

In accordance the self-describing data format can carry a transactional procedure Tuxedo payload information, and also filter information. The embodiment can express all simple or complex Tuxedo Typed Buffer (for example, STRING, CARRAY, MBSTRING, VIEW, VIEW32, FML, and FML32). The self-describing data format can also support nesting and error-checking. With this data format, a client working with payload/user data does not need additional describing files in order to make sure of the data, and this procedure to extract user data is significant.

Figure 4:
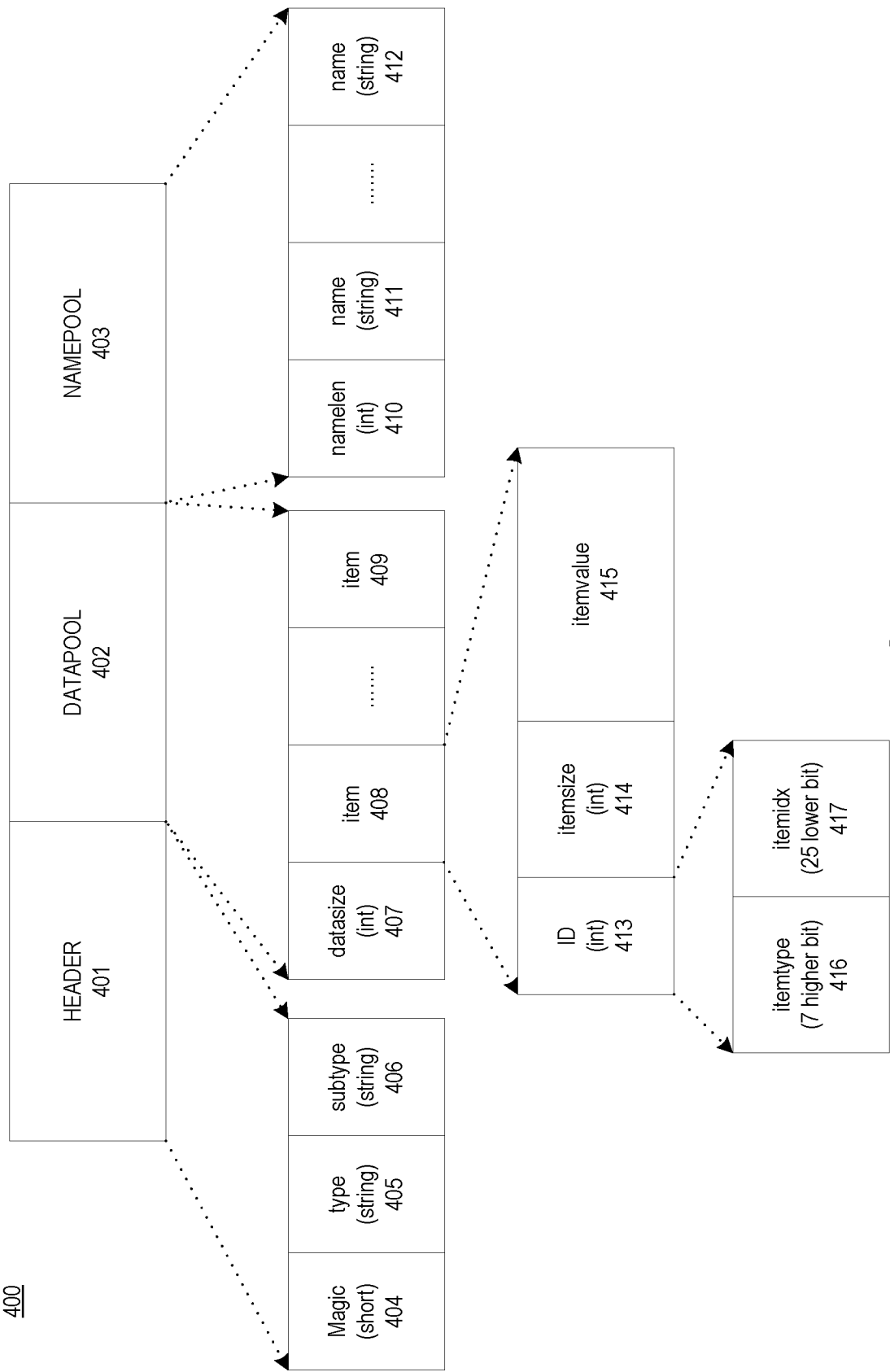
FIG. 4 shows an illustration of a unified data format, in accordance with an embodiment of the invention.

FIG. 4 shows an illustration of a unified data format, in accordance with an embodiment of the invention.

As shown in FIG. 4, a data format 400 can comprise a header 401, a datapool 402, and a namepool 403. The header 401 can comprise a magic 404, a type 405, and a subtype 406. The datapool 402 can comprise a datasize (as an integer) 407, and items 408, 409. The namepool 403 can comprise a namelen 410, and names (as strings) 411, 412.

In accordance with an embodiment, item 408 can comprise an ID 413, an itemsize 414, and an itemvalue 415. The ID can comprise an itemtype (7 higher bit) 416, and itemidx (25 lower bit) 417.

In accordance with an embodiment, the magic 404 is a fixed value of 0x2BEA. Magic can help determine if the payload data associated with the data format is corrupt. Type 405 can identify the Tuxedo Buffer Type of the original payload, and the subtype 406 can identify the Tuxedo Buffer Subtype of the original payload data.

In accordance with an embodiment, the datapool 402 can comprise the desired payload/user data can be captured. The datasize 407 can be the size of all data contained in the datapool (item 1+item 2+item 3 . . . ). The item 408 can comprise an ID 413, which can be a 32 bit identification, by itemtype (7 higher bit) and itemidx (25 lower bit). The 7 higher bits are itemtype, and itemtype could be, for example FLD_SHORT, FLD_INT, FLD_LONG, FLD_CHAR, FLD_ FLOAT, FLD_DOUBLE, FLD_BOOL, FLD_UCHAR, FLD_SCHAR, FLD_UINT, FLD_ULONG, FLD_LLONG, FLD_ULLONG, FLD_LDOUBLE, FLD_ DECIMAL, or FLD_WCHAR, FLD_PTR, FLD_FML32, FLD_VIEW32, FLD_STRING, FLD_MBSTRING or FLD_ CARRAY. The 25 lower bits are itemidx, if indexed begins with 0, it could be 0, 1, 2, 3, 4, 5 . . . etc.

In accordance with an embodiment, FLD_** can be a macro, of which the definitions are as follows:
define FLD_SHORT 0
define FLD_LONG 1
define FLD_CHAR 2
define FLD_FLOAT 3
define FLD_DOUBLE 4
define FLD_STRING 5
define FLD_CARRAY 6
define FLD_INT 7
define FLD_DECIMAL 8
define FLD_PTR 9
define FLD_FML32 10
define FLD_VIEW32 11
define FLD_MBSTRING 12
define FLD_FML 13
define FLD_BOOL 14
define FLD_UCHAR 15
define FLD_SCHAR 16
define FLD_WCHAR 17
define FLD_UINT 18
define FLD_ULONG 19
define FLD_LLONG 20
define FLD_ULLONG 21
define FLD_LDOUBLE 22
define FLD_USHORT 23

In accordance with an embodiment, itemsize 414 can be dependent on the itemtype 416. If itemtype is FLD_SHORT, FLD_INT, FLD_LONG, FLD_CHAR, FLD_FLOAT, FLD_ DOUBLE, FLD_BOOL, FLD_UCHAR, FLD_SCHAR, FLD_UINT, FLD_ULONG, FLD_LLONG, FLD_ULL- ONG, FLD_LDOUBLE, FLD_DECIMAL, or FLD_WCHAR, and itemvalue is fixed length, then itemsize is not existed. item=ID+itemvalue. Otherwise, itemvalue is variable length, and itemsize is existed. item=ID+itemsize+ itemvalue.

In accordance with an embodiment, itemvalue 415 is supported nesting, and it could be a sub Fast Data. If itemtype is FLD_PTR, it is support for FML32. First, it will serialize this pointer to Tuxedo Typed Buffer, then convert it to corresponding FAST DATA format value, and store it in itemvalue. If itemtype is FLD_FML32 or FLD_VIEW32, Itemvalue is a nesting Fast Data.

In accordance with a namelen 410 is size of all Names; it could be 0 if name is null. For FML32/FML, name 411 is field name. For SRTING/MBSTRING/CARRAY, name 411 is alias name. For VIEW32/VIEW, name 411 is member name.

What follows are three examples of a Fast Data data format:
magic(0x2BEA)+type("FML32")+subtype('\0')+datasize (18)+ID(167772268)+item_value(12)+ID(33554541)+ itemsize(2)+item_value("abc")++namelen(9)+name ("FLD0")+'\a'+name("FLD1")
magic(0x2BEA)+type("VIEW32\a")+subtype('A\0')+data- size(55)+ID(FLD_INT<13|0)+item_value(10)+ID(FLD_ DOUBLE<13|1)++item_value(20.5lf)+ID(FLD_ DOUBLE<13|2)+item_value(10.1lf)+ID(FLD_ STRING<13|3)+itemsize(3)+item_value("abc")+namelen (5)+name("a")+'\a'+name("b")+'\a'+name("c")
magic(0x2BEA)+type("STRING")+subtype('\0')+datasize (12)+ID(FLD_STRING<13|0)+itemsize(2)+item_value ("01")+ID(FLD_STRING<13|1)+itemsize(2)+item_value ("34")++namelen(12)+name("alias1")+'\a'+name("alias2")

In accordance with an embodiment, the disclosed data structure can carry not only Tuxedo payload information, but also filter information. Fast Data is very powerful, and can express all simple or complex Tuxedo Typed Buffer, and supports nesting and error-checking. With this new data format, the customer does not need to maintain any describing files.

Fast Data can allow a user or system to siphon off transactional data from Tuxedo Typed Buffers in order to be used the transaction data in other applications and systems, such as Business Intelligence.

Figure 5:
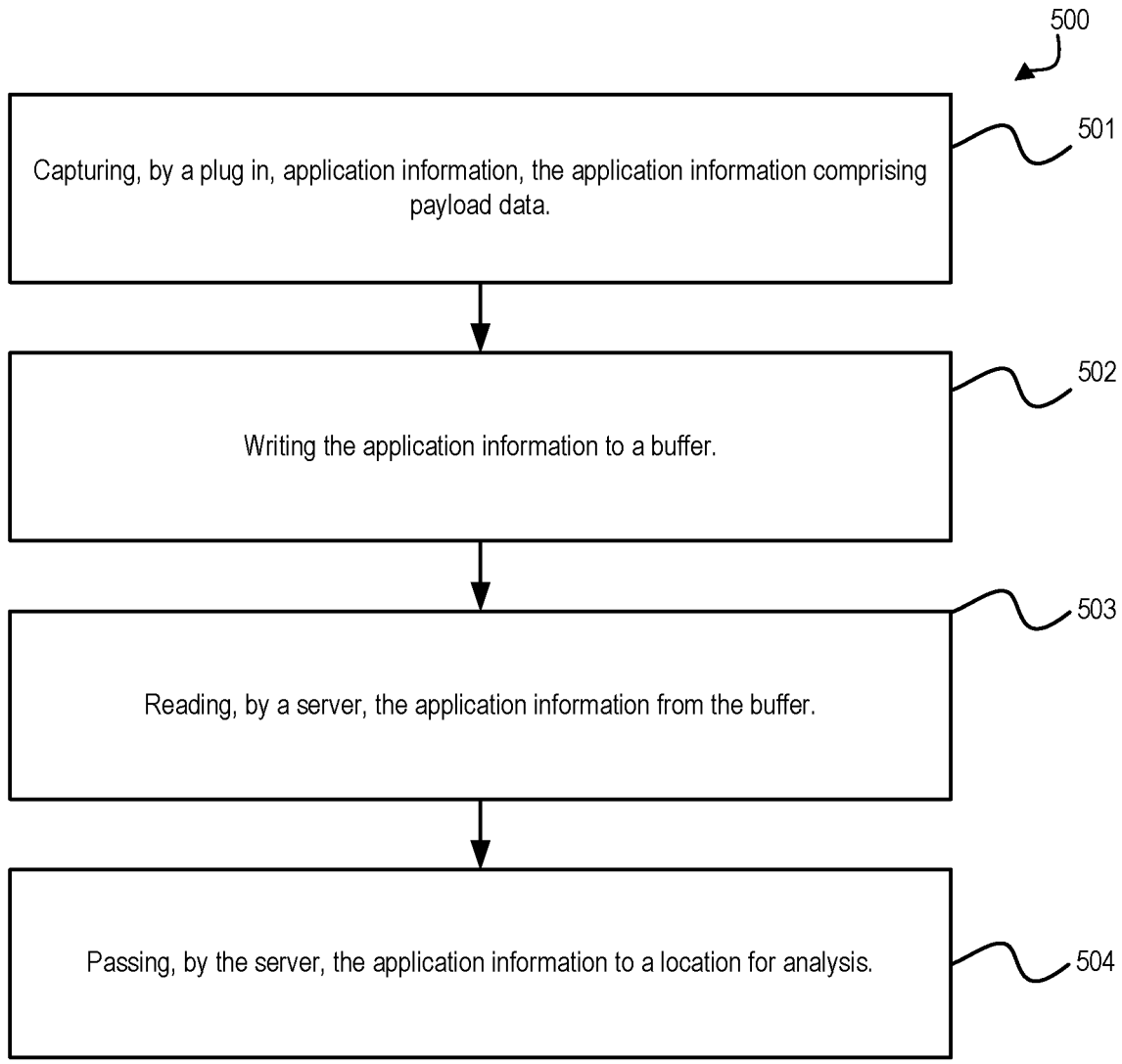
FIG. 5 shows a flow chart of an exemplary method for supporting data payload collection in a transaction processing environment.

FIG. 5 shows a flow chart of an exemplary method for supporting data payload collection in a transaction processing environment. The exemplary method 500 can begin at step 501 with capturing, by a plug-in, application information, the application information comprising payload data. At step 502, the method can write the application information to a buffer. At step 503, the method continues with reading, by a server, the application information from the buffer. At step 504, the method can pass, by the server, the application information to a location for analysis.

Many features of the present invention can be performed in, using, or with the assistance of hardware, software, firmware, or combinations thereof. Consequently, features of the present invention may be implemented using a processing system (e.g., including one or more processors).

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs). Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for supporting data payload collection in a transactional middleware machine environment, comprising:
   providing, a monitoring framework, including a data collection engine, the monitoring framework monitoring a transaction within the middleware machine environment;
   capturing, at the monitoring framework, transactional procedure data of the monitored transaction;
   writing the transactional procedure data in a self-describing format to a buffer, wherein the self-describing format carries filter information and user payload data; and
   filtering, based on the filter information, the user payload data from the self-describing data format;
   wherein the self-describing data format expresses a plurality of typed buffers, the plurality of typed buffers comprising both self-describing and non-self-describing formats; and
   wherein the self-describing data format provides an error checking mechanism for the user payload data carried by the self-describing data format.

2. The method of claim 1, further comprising:
   passing the filtered user payload data to an analysis application.

3. The method of claim 1,
   wherein the self-describing format comprises a header.

4. The method of claim 3, wherein the header comprises a block holding a fixed value used to determine if the user payload data is corrupt, a block identifying a data type and a block identifying a sub-data type.

5. The method of claim 1, further comprising:
   providing, at the monitoring framework, a user interface; and
   receiving the filter information from an instruction received at the user interface.

6. A system for supporting data payload collection in a transaction processing environment, the system comprising:
   one or more microprocessors; and
   a processor, running on the one or more microprocessors, wherein the processor operates to perform steps comprising:
      providing, a monitoring framework, including a data collection engine, the monitoring framework monitoring a transaction within the middleware machine environment;
      capturing, at the monitoring framework, transactional procedure data of the monitored transaction;
      writing the transactional procedure data in a self-describing format to a buffer, wherein the self-describing format carries filter information and user payload data; and
      filtering, based on the filter information, the user payload data from the self-describing data format;
      wherein the self-describing data format expresses a plurality of typed buffers, the plurality of typed buffers comprising both self-describing and non-self-describing formats; and
      wherein the self-describing data format provides an error checking mechanism for the user payload data carried by the self-describing data format.

7. The system of claim 6, the steps further comprising:
   passing the filtered user payload data to an analysis application.

8. The system of claim 6, wherein the self-describing format comprises a header.

9. The system of claim 8, wherein the header comprises a block holding a fixed value used to determine if the user payload data is corrupt, a block identifying a data type and a block identifying a sub-data type.

10. The system of claim 6, further comprising:
providing, at the monitoring framework, a user interface; and
receiving the filter information from an instruction received at the user interface.

11. A non-transitory machine readable storage medium having instructions stored thereon for supporting data payload collection in a transaction processing environment that when executed cause a system to perform steps comprising:
providing, a monitoring framework, including a data collection engine, the monitoring framework monitoring a transaction within the middleware machine environment;
capturing, at the monitoring framework, transactional procedure data of the monitored transaction;
writing the transactional procedure data in a self-describing format to a buffer, wherein the self-describing format carries filter information and user payload data; and
filtering, based on the filter information, the user payload data from the self-describing data format;
wherein the self-describing data format expresses a plurality of typed buffers, the plurality of typed buffers comprising both self-describing and non-self-describing formats; and
wherein the self-describing data format provides an error checking mechanism for the user payload data carried by the self-describing data format.

12. The non-transitory machine readable storage medium of claim 11, the steps further comprising:
passing the filtered user payload data to an analysis application.

13. The non-transitory machine readable storage medium of claim 11,
wherein the self-describing format comprises a header.

14. The non-transitory machine readable storage medium of claim 13, wherein the header comprises a block holding a fixed value used to determine if the user payload data is corrupt, a block identifying a data type and a block identifying a sub-data type.

* * * * *